No. 753,977. PATENTED MAR. 8, 1904.
A. A. GURTNER.
PHOTOGRAPHIC PLATE.
APPLICATION FILED JAN. 19, 1903.
NO MODEL.
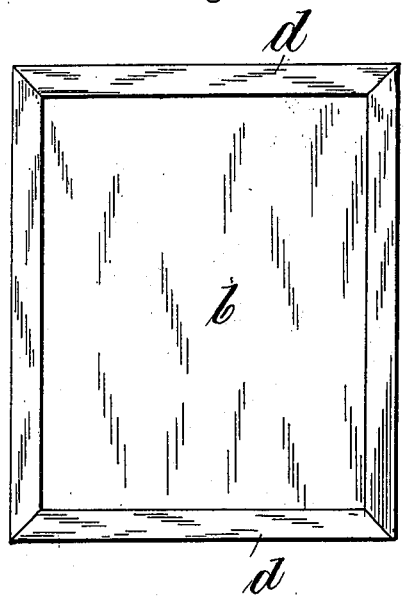
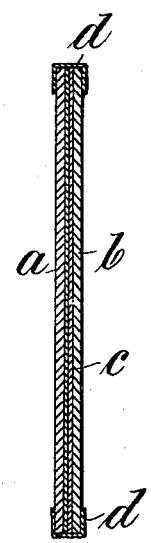

No. 753,977. Patented March 8, 1904.

UNITED STATES PATENT OFFICE.

ADOLF ALFRED GURTNER, OF BERN, SWITZERLAND.

PHOTOGRAPHIC PLATE.

SPECIFICATION forming part of Letters Patent No. 753,977, dated March 8, 1904.

Application filed January 19, 1903. Serial No. 139,681. (No model.)

*To all whom it may concern:*

Be it known that I, ADOLF ALFRED GURTNER, a citizen of Switzerland, and a resident of Bern, Switzerland, have invented certain new and useful Improvements in Photographic Plates; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to photographic plates for use in making colored photographs, and has for its object the production of a plate having two films to be simultaneously exposed, one of them colored with a non-actinic dye, and more especially designed for making colored photographs according to the process described in my application Serial No. 119,330, filed August 11, 1902.

Referring to the drawings, in which like parts are similarly designated, Figure 1 is an elevation, and Fig. 2 is a section, of the double film-plate.

The composite plate consists of a sheet of glass $a$, provided with an actinic coating $c$, containing silver chlorid or a mixture of silver chlorid and silver bromid. This film is colored or stained a yellowish red or orange with a suitable stain, as anilin orange. Another sheet of glass $b$ is coated with an orthochromatic film $b'$, containing silver bromid. The two films are separably secured against one another, film against film, by any suitable means—as, for example, by means of a paper binding-strip $d$. The double plate so made is placed in the plate-holder so that the glass $a$ is turned outward, (toward the object,) so that when exposed the orthochromatic bromid film $b'$ lying behind it will only be affected by the red and yellow rays.

In developing, the two plates are separated from one another in the dark room and separately developed.

Having thus described my said invention, what I claim as new therein, and desire to secure by Letters Patent, is—

1. A photographic plate comprising a color-filter film for red and sensitive to light, and a second separable film, substantially as described.

2. A photographic plate comprising a film sensitive to light and stained with anilin orange, and a second film also sensitive to light in juxtaposition to the first film, substantially as described.

3. A photographic plate comprising two carriers, each provided with an actinic film and the films placed against one another, and a separable binding-strip to hold the carriers and films together, substantially as described.

4. A photographic plate comprising two carriers one of which is provided with an orthochromatic film containing silver bromid and the other provided with a colored film containing silver chlorid, both carriers being connected together with their films placed against one another.

5. A photographic plate comprising two carriers one of which is provided with an orthochromatic film containing silver bromid and the other provided with an orange-colored film containing silver chlorid, both carriers being held together by a separable binding-strip, the films being placed against one another.

In testimony that I claim the foregoing as my invention I have signed my name in presence of two subscribing witnesses.

ADOLF ALFRED GURTNER.

Witnesses:
G. MARCHAND,
E. FLEUTI.